(12) United States Patent
Lou et al.

(10) Patent No.: US 12,108,386 B2
(45) Date of Patent: Oct. 1, 2024

(54) COMMUNICATIONS METHOD AND APPARATUS

(71) Applicant: Huawei Technologies Co., Ltd., Shenzhen (CN)

(72) Inventors: Chong Lou, Shanghai (CN); Qiang Fan, Hefei (CN); Qufang Huang, Shenzhen (CN); Xiaoying Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

(21) Appl. No.: 17/487,879

(22) Filed: Sep. 28, 2021

(65) Prior Publication Data

US 2022/0022224 A1  Jan. 20, 2022

Related U.S. Application Data

(63) Continuation of application No. PCT/CN2020/081510, filed on Mar. 26, 2020.

(30) Foreign Application Priority Data

Mar. 29, 2019  (CN) .......................... 201910253510.2

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04W 72/0446* (2013.01);
(Continued)

(58) Field of Classification Search
CPC ......... H04W 72/0446; H04W 72/1268; H04W 72/21; H04W 72/23; H04W 72/56;
(Continued)

(56) References Cited

U.S. PATENT DOCUMENTS

2015/0271791 A1   9/2015 Webb et al.
2019/0208478 A1*  7/2019 Park ..................... H04L 5/0053
(Continued)

FOREIGN PATENT DOCUMENTS

CN    108513735 A    9/2018
CN    108521885 A    9/2018
(Continued)

OTHER PUBLICATIONS

"SR configuration and UL data scheduling," 3GPP TSG RAN WG1 Meeting #90, R1-1712591, Prague, P.R. Czechia, Total 4 pages, 3rd Generation Partnership Project, Valbonne, France (Aug. 21-25, 2017).

(Continued)

*Primary Examiner* — Kan Yuen
(74) *Attorney, Agent, or Firm* — Leydig, Voit & Mayer, Ltd.

(57) ABSTRACT

A method includes: triggering, by a terminal device, a scheduling request (SR); in response to determining that a physical uplink control channel (PUCCH) carrying the SR and a physical uplink shared channel (PUSCH) carrying a first data packet overlap in time domain of a first uplink resource and a processing status of the PUSCH on the first uplink resource is processing completed, sending, based on the processing status of the PUSCH on the first uplink resource, the PUCCH on an overlapping time domain resource. According to the method, when the PUCCH carrying the SR and the PUSCH overlap in time domain of the first uplink resource, the terminal device considers the processing status of the PUSCH on the first uplink resource, and may determine, based on the processing status of the PUSCH on the first uplink resource, to send the PUCCH or the PUSCH on the overlapping time domain resource.

12 Claims, 6 Drawing Sheets

(51) Int. Cl.
  *H04W 72/0446* (2023.01)
  *H04W 72/23* (2023.01)
  *H04W 72/566* (2023.01)
  *H04W 80/02* (2009.01)

(52) U.S. Cl.
  CPC ......... *H04W 72/23* (2023.01); *H04W 72/566* (2023.01); *H04W 80/02* (2013.01)

(58) Field of Classification Search
  CPC . H04W 72/566; H04W 72/569; H04W 80/02; H04L 1/1812; H04L 1/1822; H04L 1/1887; H04L 1/189; H04L 1/1896; H04L 1/20
  See application file for complete search history.

(56) References Cited

U.S. PATENT DOCUMENTS

| | | | |
|---|---|---|---|
| 2020/0053801 A1* | 2/2020 | Hosseini | H04W 52/281 |
| 2020/0236582 A1* | 7/2020 | Chin | H04W 72/23 |
| 2020/0267594 A1 | 8/2020 | Xu et al. | |
| 2020/0281012 A1* | 9/2020 | Behravan | H04W 72/1268 |
| 2022/0022224 A1* | 1/2022 | Lou | H04W 72/566 |
| 2022/0061070 A1* | 2/2022 | Miao | H04W 72/542 |
| 2022/0078768 A1* | 3/2022 | El Hamss | H04L 5/0055 |
| 2022/0078813 A1* | 3/2022 | Miao | H04W 36/0088 |
| 2022/0217760 A1* | 7/2022 | Iyer | H04L 5/0053 |

FOREIGN PATENT DOCUMENTS

| | | |
|---|---|---|
| CN | 108702768 A | 10/2018 |
| CN | 109392168 A | 2/2019 |
| RU | 2681205 C2 | 3/2019 |
| WO | 2018111948 A1 | 6/2018 |
| WO | 2018121052 A1 | 7/2018 |

OTHER PUBLICATIONS

"3rd Generation Partnership Project; Technical Specification Group Radio Access Network; NR; Medium Access Control (MAC) protocol specification (Release 15)," 3GPP TS 38.321 V15.4.0, pp. 1-77, 3rd Generation Partnership Project, Valbonne, France (Dec. 2018).

Catt, "Scenarios Analysis for Intra-UE Prioritization and Multiplexing," 3GPP TSG RAN WG2 #105, Athens, Greece, R2-1900155, Total 7 pages, 3rd Generation Partnership Project, Valbonne, France (Feb. 25-Mar. 1, 2019).

Catt, "Solutions for Intra-UE Prioritization and Multiplexing," 3GPP TSG RAN WG2 #105, Athens, Greece, R2-1900156, Section 2.5, Total 7 pages, 3rd Generation Partnership Project, Valbonne, France (Feb. 25-Mar. 1, 2019).

Huawei (Rapporteur), "E-mail discussion summary [104#39][NR/IIOT] Intra UE prioritization UL Control Data (Huawei)," 3GPP TSG RAN WG2 #105, Athens, Greece, R2-1901439, Total 25 pages, 3rd Generation Partnership Project, Valbonne, France (Feb. 25-Mar. 1, 2019).

Catt, "Prioritization rule for SR-PUSCH collision," 3GPP TSG RAN WG2 #105bis, Xi'an, China, R2-1903144, Section 2.2.1, Total 5 pages, 3rd Generation Partnership Project, Valbonne, France (Apr. 8-12, 2019).

"E-mail discussion summary [104#39][NR/IIOT] Intra UE prioritization UL Control Data (Huawei)," 3GPP TSG-RAN WG2 #105, R2-1901439, Athens, Greece, XP051602798, Total 34 pages, 3rd Generation Partnership Project, Valbonne, France (Feb. 25-Mar. 1, 2019).

"Solutions for Intra-UE Prioritization and Multiplexing," 3GPP TSG-RAN WG2 Meeting 104, R2-1900156, Athens, Greece, XP051601556, Total 7 pages, 3rd Generation Partnership Project, Valbonne, France (Feb. 25-Mar. 1, 2019).

"Scenarios Analysis for Intra-UE Prioritization and Multiplexing," 3GPP TSG-RAN WG2 Meeting 105, R2-1900155, Athens, Greece, XP051601555, Total 7 pages, 3rd Generation Partnership Project, Valbonne, France (Feb. 25-Mar. 1, 2019).

CMCC, "Intra-UE Prioritization for IIoT," 3GPP TSG-WG2 #105, Xi'an, China, R2-1904366, Total 5 pages, 3rd Generation Partnership Project, Valbonne, France (Apr. 8-12, 2019).

Sequans Communications, "Intra-UE Prioritization for IIoT," 3GPP TSG-RAN WG2 Meeting #105, Athens, Greece, R2-1901547, Total 4 pages, 3rd Generation Partnership Project, Valbonne, France (Feb. 25-Mar. 1, 2019).

\* cited by examiner

COMMUNICATIONS METHOD AND APPARATUS

CROSS-REFERENCE TO RELATED APPLICATIONS

This application is a continuation of International Application No. PCT/CN2020/081510, filed on Mar. 26, 2020, which claims priority to Chinese Patent Application No. 201910253510.2, filed on Mar. 29, 2019. The disclosures of the aforementioned applications are hereby incorporated by reference in their entireties.

TECHNICAL FIELD

This application relates to the field of communications technologies, and in particular, to a communications method and apparatus.

BACKGROUND

In a $5^{th}$ generation (5G) communications system, a physical uplink control channel (PUCCH) or a physical uplink shared channel (PUSCH) may transmit data from any symbol in a transmission time unit (for example, a slot). A transmission time length is also not fixed. For example, the transmission time length may be 1 to 14 symbols.

In the current 5G communications system, the PUCCH and the PUSCH cannot simultaneously transmit the data on a same carrier. However, in an actual scenario, a resource occupied by the PUCCH may be conflicted with a resource occupied by the PUSCH. For example, the 5G communications system may support a plurality of service types, such as an ultra reliability and low latency communications (URLLC) service type and an enhanced mobile broadband (eMBB) service type. Therefore, a terminal device may simultaneously have communication requirements for the plurality of service types, for example, the terminal device simultaneously has communication requirements of the URLLC service type and the eMBB service type. After the terminal device has to-be-sent URLLC data and triggers a scheduling request (SR), the PUCCH carrying the SR and the PUSCH carrying the eMBB data may overlap in time domain of an uplink resource. Therefore, how to handle the conflict between the uplink resource on the PUCCH and the uplink resource on the PUSCH needs to be further studied.

SUMMARY

In view of this, this application provides a communications method and apparatus, to send data when a PUCCH carrying an SR and a PUSCH carrying data overlap in time domain of an uplink resource.

According to a first aspect, an embodiment of this application provides a communications method, including: triggering, by a terminal device, a scheduling request SR; if determining that a physical uplink control channel PUCCH carrying the SR and a physical uplink shared channel PUSCH carrying a first data packet overlap in time domain of a first uplink resource, obtaining a processing status of the PUSCH on the first uplink resource; and sending, based on the processing status of the PUSCH on the first uplink resource, the PUCCH or the PUSCH on an overlapping time domain resource.

According to the foregoing method, when the PUCCH carrying the SR and the PUSCH overlap in time domain of the first uplink resource, the terminal device considers the processing status of the PUSCH on the first uplink resource, and may determine, based on the processing status of the PUSCH on the first uplink resource, to send the PUCCH or the PUSCH on the overlapping time domain resource, so that uplink information sent on the overlapping time domain resource is determined, and efficiency of a communications system is improved.

In a possible design, the sending, by the terminal device based on the processing status of the PUSCH on the first uplink resource, the PUCCH on an overlapping time domain resource includes: when the processing status of the PUSCH on the first uplink resource is processing completed, if determining that a first priority of a logical channel for triggering the SR is higher than or equal to a second priority of a logical channel of the first data packet, sending, by the terminal device, the PUCCH on the overlapping time domain resource.

In this way, because the first priority is higher than the second priority, the terminal device sends the PUCCH on the overlapping time domain resource, so that a network device can schedule, in time by using the PUCCH, to-be-sent data of triggering the SR, to effectively reduce a latency of the to-be-sent data.

In a possible design, the sending, by the terminal device, the PUCCH on the overlapping time domain resource if determining that a first priority is higher than or equal to a second priority includes: if determining, at a MAC layer, that the first priority is higher than or equal to the second priority, sending, by the terminal device, first indication information to a physical layer of the terminal device; and sending, by the terminal device, the PUCCH on the overlapping time domain resource based on the first indication information at the physical layer; or notifying, by the terminal device at a MAC layer, a physical layer of the first priority and the second priority, and if determining, at the physical layer, that the first priority is higher than or equal to the second priority, sending, by the terminal device, the PUCCH on the overlapping time domain resource. The second priority may be obtained by the terminal device when the terminal device assembles the first data packet.

According to a second aspect, an embodiment of this application provides a communications method. The method includes: triggering, by a terminal device, a scheduling request SR; and if determining that a PUCCH carrying the SR and a PUSCH carrying a first data packet overlap in time domain of a first uplink resource, sending, based on a resource occupied by the PUSCH and a resource requirement of a logical channel for triggering the SR, PUCCH or the PUSCH on an overlapping time domain resource.

According to the foregoing method, when the PUCCH carrying the SR and the PUSCH overlap in time domain of the first uplink resource, the terminal device considers the PUSCH resource and the resource requirement of the logical channel for triggering the SR, and may determine, based on the PUSCH resource and the resource requirement of the logical channel for triggering the SR, to send the PUCCH or the PUSCH on the overlapping time domain resource. This ensures efficiency of sending uplink information on the overlapping time domain resource. Because the PUSCH resource and the resource requirement of the logical channel for triggering the SR are information configured by a network device and are not affected by a scenario, the foregoing method has relatively strong applicability and may be applicable to a plurality of possible scenarios, for example, a new data transmission scenario or a data retransmission scenario.

In a possible design, the sending, by the terminal device based on a resource occupied by the PUSCH and a resource requirement of a logical channel for triggering the SR, the PUSCH on the overlapping time domain resource includes: if determining that the resource occupied by the PUSCH meets the resource requirement of the logical channel for triggering the SR, sending, by the terminal device, the PUSCH on the overlapping time domain resource.

According to the foregoing method, that the PUSCH resource meets the resource requirement of the logical channel for triggering the SR indicates that data triggering the SR may be sent on the PUSCH resource. In this case, the PUSCH may be sent, to reduce a latency of the data transmitted on the PUSCH.

In a possible design, the sending, by the terminal device, the PUSCH on the overlapping time domain resource if determining that the resource occupied by the PUSCH meets the resource requirement of the logical channel for triggering the SR includes: if determining that a first priority of the logical channel for triggering the SR is lower than or equal to a second priority of a logical channel of the first data packet, sending, by the terminal device, the PUSCH on the overlapping time domain resource.

In a possible design, the method further includes: if the first priority is higher than the second priority, sending, by the terminal device, the PUCCH on the overlapping time domain resource.

By using the foregoing method, after determining that the PUSCH resource meets the resource requirement of the logical channel for triggering the SR, the terminal device further determines, based on a priority comparison result, to send the PUCCH or the PUSCH on the overlapping time domain resource, so that when the PUSCH resource meets the resource requirement of the logical channel for triggering the SR but the first priority is higher than the second priority, the terminal device still sends the PUCCH. This effectively avoids a problem that determining is not accurate enough only based on the PUSCH resource and the resource requirement of the logical channel for triggering the SR, and reduces a latency of to-be-sent data triggering the SR.

In a possible design, the sending, by the terminal device based on a resource occupied by the PUSCH and a resource requirement of a logical channel for triggering the SR, the PUCCH on an overlapping time domain resource includes: if determining that the resource occupied by the PUSCH does not meet the resource requirement of the logical channel for triggering the SR, sending, by the terminal device, the PUCCH on the overlapping time domain resource.

According to the foregoing method, because the PUSCH resource does not meet the resource requirement of the logical channel for triggering the SR, the terminal device sends the PUCCH on the overlapping time domain resource, so that a network device can schedule, in time by using the PUCCH, to-be-sent data triggering the SR, to effectively reduce a latency of the to-be-sent data.

Based on the possible designs of the first aspect and the second aspect, if the terminal device sends the PUCCH on the first uplink resource, the method further includes: transmitting, by the terminal device, the first data packet on a second uplink resource, where the second uplink resource and the first uplink resource correspond to a same HARQ process.

According to the foregoing method, the first data packet can be transmitted again, to avoid a first data packet loss or relatively large service performance loss of the first data packet.

In a possible design, the first data packet is stored in a buffer of the HARQ process corresponding to the second uplink resource.

Based on the possible designs of the first aspect and the second aspect, if the terminal device sends the PUCCH on the first uplink resource, the method further includes: sending, by the terminal device, a second data packet on a second uplink resource, where the second data packet includes some or all of information in the first data packet.

In this way, some or all of information in the first data packet is reassembled into the second data packet through data reassembly, so that a network device can obtain some or all information in the first data packet, to effectively avoid a data loss.

Based on the possible designs of the first aspect and the second aspect, if the terminal device sends the PUCCH on the first uplink resource, the method further includes: sending, by the terminal device, third indication information to a network device, where the third indication information is used to indicate that the first data packet is not sent or is not completely sent. In this way, the third indication information is sent to the network device, so that the network device can learn that the first data packet is not sent or is not completely sent, to facilitate retransmission and avoid a data loss.

According to a third aspect, an embodiment of this application provides a communications method. The method includes:

assembling, by a terminal device, a first data packet to be transmitted on a first uplink resource; and if determining that the first data packet is not sent or is not completely sent, transmitting the first data packet on a second uplink resource, where the second uplink resource and the first uplink resource correspond to a same HARQ process.

In a possible design, the first data packet is stored in a buffer of the HARQ process corresponding to the second uplink resource.

According to a fourth aspect, an embodiment of this application provides an SR triggering method. The method includes:

triggering, by a terminal device, a plurality of BSRs, where the plurality of BSRs respectively correspond to a plurality of SRs, if determining that a plurality of PUCCHs carrying the plurality of SRs overlap in time domain of a third uplink resource, determining a target BSR based on priorities of logical channels for triggering the plurality of BSRs, where a priority of a logical channel for triggering the target BSR is higher than or equal to a priority of a logical channel for triggering another BSR in the plurality of BSRs, and triggering, by the terminal device, an SR corresponding to the target BSR.

According to the foregoing method, the priorities of the logical channels for triggering the plurality of BSRs are compared to determine the SR to be triggered, to effectively reduce a latency of corresponding to-be-sent data.

According to a fifth aspect, an embodiment of this application provides a communications method. The method includes:

assembling, by a terminal device, a first data packet to be transmitted on a first uplink resource, and if determining that the first data packet is not sent or is not completely sent, transmitting a second data packet on a second uplink resource, where the second data packet includes some or all of information in the first data packet.

According to a sixth aspect, an embodiment of this application provides an apparatus. The apparatus may be a terminal device, or may be a chip disposed in a terminal device. The apparatus has a function of implementing various possible designs in the first aspect to the fifth aspect. The function may be implemented by hardware, or may be implemented by hardware executing corresponding software. The hardware or software includes one or more units or modules corresponding to the foregoing functions.

According to a seventh aspect, an embodiment of this application provides an apparatus, including a processor and a memory. The processor is configured to execute an instruction stored in the memory, and when the instruction is executed, the apparatus is enabled to perform the method in any possible design in the first aspect to the fifth aspect.

According to an eighth aspect, an embodiment of this application further provides a computer-readable storage medium, including an instruction. When the instruction is executed, the method in any one of the foregoing aspects or the possible designs of the foregoing aspects is implemented.

According to a ninth aspect, an embodiment of this application further provides a computer program product, including a computer program or an instruction. When the computer program or the instruction is executed, the method in any one of the foregoing aspects or the possible designs of the foregoing aspects is implemented.

DESCRIPTION OF EMBODIMENTS

Figure 1:
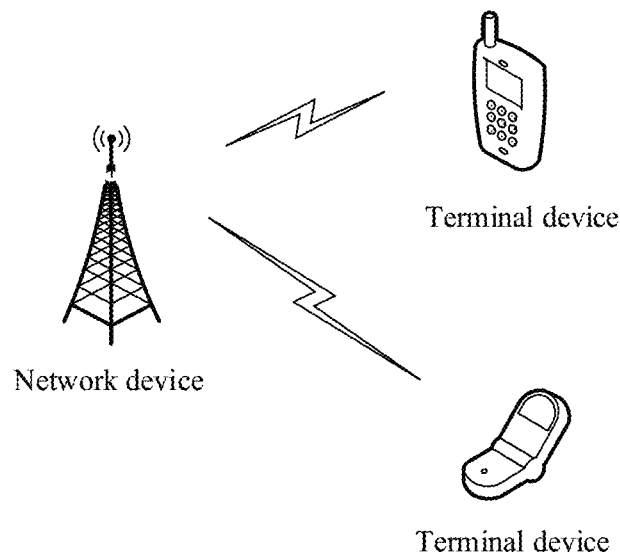
FIG. 1 is a schematic diagram of a possible system architecture to which an embodiment of this application is applicable.

To make the objectives, technical solutions and advantages of the embodiments of this application clearer, the following further describes the embodiments of this application in detail with reference to the accompanying drawings.

Some terms of the embodiments of this application are first described, so as to help persons skilled in the art have a better understanding.

(1) The terminal device is a device having a wireless transceiver function, and may be deployed on land, where the deployment includes indoor or outdoor, handheld, wearable, or vehicle-mounted deployment, may be deployed on water (for example, on a ship), or may be deployed in air (for example, on an aero craft, a balloon, and a satellite). The terminal device may be a mobile phone, a tablet (Pad), a computer having a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of this application. The terminal device may also be sometimes referred to as a user equipment (UE), a mobile station, a remote station, or the like. In the embodiments of this application, the terminal device may be an entire terminal that is independently sold, or may be a chip that implements a function of the terminal. A specific technology, a device form, and a name used by the terminal device are not limited in the embodiments of this application.

(2) A network device is an access device used by a terminal device to access this mobile communications system in a wireless manner, and may be a base station, an evolved NodeB (eNodeB), a transmission reception point (TRP), a next generation NodeB (gNB) in a 5G mobile communications system, a base station in a future mobile communication system, or an access node in a wireless-fidelity (Wi-Fi) system; or may be a module or a unit that completes some functions of a base station, for example, may be a central unit (CU); or may be a distributed unit (DU). In the embodiments of this application, the network device may be an access device that is independently sold, or may be a chip that implements a function of an access device. A specific technology and a specific device form that are used by the network device are not limited in the embodiments of this application.

(3) The terms "system" and "network" may be used interchangeably in the embodiments of this application. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression means any combination of these items, including any combination of singular items (pieces) or plural items (pieces). For example, at least one item (piece) of a, b, or c may represent: a, b, c, a-b, a-c, b-c, or a-b-c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects. For example, first indication information and second indication information are merely intended to distinguish between different indication information, but do not indicate that the two types of indication information are different in content, priorities, sending sequences, importance, or the like.

FIG. 1 is a schematic diagram of a possible system architecture to which an embodiment of this application is applicable. The system architecture shown in FIG. 1 includes a network device and a terminal device. It should be understood that a quantity of network devices and a quantity of terminal devices in the system architecture are not limited in the embodiments of this application. In addition to the network device and the terminal device, the system architecture to which the embodiment of this application is applicable may further include another device such as a core network device, a wireless relay device, or a wireless backhaul device. This is not limited in this embodiment of this application either. In addition, the network device in the embodiments of this application may integrate all functions into one independent physical device, or may distribute the functions on a plurality of independent physical devices. This is not limited in the embodiments of this application either. In addition, the terminal device in this embodiment of this application may be connected to the network device in a wireless manner.

The system architecture shown above may be applicable to communications systems of various radio access technologies (RAT), for example, a long term evolution (LTE) communications system, a 5G communications system, and another possible communications system.

The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the communications system architecture and the emergence of new service scenarios, the technical solutions provided in the embodiments of this application are also applicable to similar technical problems.

The 5G communications system is used as an example. An uplink channel used for uplink transmission may include a PUSCH and a PUCCH. The PUSCH may carry data and/or uplink control information (UCI), and the PUCCH may carry UCI. The UCI carried on the PUCCH may include an SR. The SR may be understood as scheduling request information sent by the terminal device to the network device, and indicates that the terminal device has uplink data to be sent.

The following explains some implementations or mechanisms in this embodiment of this application. It should be noted that these explanations are intended to make this embodiment of this application more easily understood, but should not be considered as a limitation on the protection scope claimed in this application.

(1) SR Triggering

Data in the 5G communications system may be carried at a MAC layer by using a logical channel (LCH), and data of different service types may be carried by using different logical channels. One or more logical channels may be associated with one logical channel group (LCG). Each logical channel may be associated with one scheduling priority. The priority may be configured by the network device. For example, a relatively high priority may be configured for a logical channel carrying URLLC service data, and a relatively low priority may be configured for a logical channel carrying eMBB service data. In other words, the URLLC service data has the relatively high priority, and the eMBB service data has the relatively low priority. Therefore, when the terminal device has an available uplink resource, resource allocation may be preferentially considered for the data having the high-priority. When the terminal device has new data to be sent but no logical channel has to-be-sent data or a logical channel with a higher priority has to-be-sent data, the terminal device may trigger a buffer status report (BSR), to reflect a total amount of to-be-sent data on at least one logical channel, for scheduling by the network device.

However, before delivering control signaling to indicate a resource, the network device may not know that the terminal device has the to-be-sent data. Therefore, when the terminal device triggers the BSR and has no available uplink resource for sending the data, the terminal device may first request, by using a pre-configured or common uplink resource, the network device to allocate the uplink resource. For example, the terminal device may request the uplink resource by triggering an SR, or the terminal device may request the uplink resource by using a random access channel (RACH). The SR may be carried on a PUCCH that is pre-configured by the network device for the terminal device and that is used to request the uplink resource, and the random access may be performed on a physical random access channel (PRACH). In an example, a resource occupied by a PUCCH (or may also be referred to as a PUCCH resource) may be a periodic resource, and the network device may configure PUCCH resource information, for example, the PUCCH resource information may include start time information and a period. Correspondingly, after obtaining the configured PUCCH resource information, the terminal device may determine a periodic SR transmission occasion, so that when triggering the SR, the terminal device may send the SR on the SR transmission occasion.

(2) SR Sending

It is considered that the to-be-sent data in the terminal device may belong to a plurality of different service types. To help the network device learn of a service type of the to-be-sent data in the terminal device, to schedule a proper resource, an association relationship between an SR configuration and a logical channel is introduced into a 5G communications system. Specifically, the network device may configure one or more SR configurations for the terminal device. Each SR configuration includes an available PUCCH resource. These PUCCH resources may be distributed in different cells or different bandwidth parts (BWP) at different frequency domain locations in a same cell. For a logical channel that is of the terminal device and that is used to carry data, each logical channel may be associated with one SR configuration. In other words, different logical channels may be associated with different SR configurations. For example, for the terminal device, two logical channels are configured: an LCH #1 and an LCH #2. The LCH #1 is used to carry eMBB service data, and corresponds to an SR configuration #1 (a PUCCH resource #1). The LCH #2 is used to carry a URLLC service, and corresponds to an SR configuration #2 (a PUCCH resource #2).

In this way, when different service types of data are to be sent, the terminal device may send an SR based on an SR configuration corresponding to a logical channel used to carry data, so that the network device perceives a service type of the current to-be-sent data of the terminal device. For example, when URLLC service data is to be sent, the terminal device may send the SR by using the PUCCH resource #2. In this way, after detecting the SR carried by the PUCCH resource #2, the network device may learn that the to-be-sent data of the terminal device is the URLLC service data, so that an uplink resource applicable to the URLLC service data can be scheduled, for example, shorter PUSCH duration or a more reliable uplink resource may be scheduled, to meet a transmission requirement (to be specific, a low latency and high reliability) of the URLLC service data.

(3) Dynamic Scheduling and Pre-Configured Scheduling

A manner in which the network device schedules an uplink resource based on an SR or random access may be understood as dynamic scheduling. Dynamic scheduling means that the network device indicates a resource by using physical layer signaling (for example, downlink control information (DCI)), for example, an uplink grant (uplink grant). The DCI may carry information about a resource occupied by a PUSCH (or may also be referred to as a PUSCH resource), for example, a resource location in time domain and a resource location in frequency domain are included. Correspondingly, after receiving the uplink grant, the terminal device may calculate a transport block size (TBS) based on a resource size, assembles data based on the TBS, and further send the data on a corresponding resource.

However, URLLC service data may arrive at any time. It may be too slow if the resource is requested by using the SR or the random access. Therefore, the network device may further pre-configure dense periodic resources in a pre-configured scheduling manner. When the URLLC service data of the terminal device is to be sent, an uplink resource is immediately available for sending the URLLC service data, so that a latency can be reduced. Pre-configured scheduling may also be referred to as configured grant transmission. The configured grant transmission may be classified into two types. Type 1 means that the network device configures a period and a start offset, and indicates a specific resource location by using RRC, in other words, the RRC may carry the uplink grant. Unless the terminal device receives a release command of RRC signaling, it may be considered that the resource periodically appears. Type 2 means that the network device configures a period and a start offset by using radio resource control (RRC) signaling, and then activates and indicates a specific resource location by using the DCI. Unless the terminal device receives a deactivation command, it may be considered that the resource indicated by the DCI periodically appears. An advantage of using the configured grant transmission lies in that the network device does not need to deliver the control signaling each time to allocate the resource, so that control signaling overheads can be reduced, and a latency in sending an SR and a BSR by the UE can be reduced. It should be noted that using the pre-configured scheduling manner does not mean that an SR configuration does not need to be configured for the URLLC service data. A corresponding SR configuration may also be configured for the logical channel carrying aperiodic URLLC service data.

(4) Logical Channel Prioritization (LCP) Mapping Restriction

From a perspective of the terminal device, after the terminal device receives an uplink resource (which may be a resource that can be dynamically scheduled or pre-configured for scheduling) that can be used for data transmission, if inappropriate data is placed on the uplink resource (in other words, the data is placed on an inappropriate resource), a data requirement may not be met, or efficiency of a communications system may be reduced. Therefore, a step of selecting a logical channel is introduced to place appropriate data on an appropriate resource. Specifically, the network device may pre-configure, for the terminal device, the LCP mapping restriction from the logical channel to a parameter of the uplink resource. The LCP mapping restriction from the logical channel to the parameter of the uplink resource may be understood as a requirement of the logical channel for a resource, or a parameter of a resource corresponding to the logical channel. For example, the requirement of the logical channel for the resource may include a requirement for a time domain length of the resource (for example, a maximum time domain length of the resource), or it may be described as that the parameter of the resource corresponding to the logical channel includes a time domain length of the resource. In this way, after receiving the uplink resource, the terminal device may select, based on the parameter of the uplink resource, a data packet that can be mapped to the logical channel of the uplink resource, to avoid placing inappropriate data. If the uplink resource can meet a resource requirement of a logical channel, the logical channel is a logical channel that can be mapped to the uplink resource, or a logical channel that can be mapped to the uplink resource is a logical channel whose parameter of a corresponding resource matches the parameter of the uplink resource. For example, a requirement of the LCH #1 (carrying URLLC service data) for the maximum time domain length of the resource is 0.5 ms (or a maximum time domain length of a resource corresponding to the LCH #1 is 0.5 ms), and a requirement of the LCH #2 (carrying eMBB service data) for the maximum time domain length of the resource is 1 ms (or a maximum time domain length of a resource corresponding to the LCH #2 is 1 ms). When the time domain length of the uplink resource is 1 ms, it may be considered that the uplink resource is a resource for scheduling the eMBB service data, and the LCH #2 is a logical channel satisfying an LCP mapping restriction relationship, so that the terminal device may select the data in the LCH #2 for packet assembly.

It should be noted that, in addition to the foregoing described requirement for the time domain length of the resource, the requirement of the logical channel for the resource may further include another possible requirement, for example, an allowed subcarrier spacing, a configured grant period, an allowed modulation and coding scheme table, or a reliability requirement, and an allowed configured grant configuration. This is not limited in this embodiment of this application.

(5) Retransmission Mechanism

To ensure reliability of data transmission, a retransmission mechanism is introduced into a 5G communications system. Retransmission managed by a medium access control (MAC) layer is referred to as a hybrid automatic repeat request (HARQ). Simply, if a receiving end does not successfully receive a piece of data, the receiving end feeds back a negative acknowledgment (NACK) to a transmitting end. Correspondingly, after receiving the NACK, the transmitting end may retransmit the data that fails to be sent. In this mechanism, because the transmitting end may have several pieces of data being transmitted or to be retransmitted at the same time, a HARQ process and a HARQ ID are introduced to accurately identify the piece of data that needs to be retransmitted. Specifically, each HARQ process may correspond to one HARQ ID and one buffer, and is used to store a medium access control protocol data unit (MAC PDU), or a transport block (TB). For example, one cell has a maximum of 16 HARQ processes. In other words, a maximum of 16 data packets may be simultaneously transmitted or prepared for transmission. When scheduling uplink data, the network device indicates, in an explicit or implicit manner, a HARQ ID corresponding to the piece of data. When the network device wants to retransmit the piece of data, the network device also indicates the HARQ ID. In this way, the terminal device may learn, based on the HARQ ID, which data needs to be retransmitted. Specifically, the terminal device may obtain, based on the HARQ ID, a stored transport block (TB), namely, a MAC PDU, from a buffer corresponding to a physical layer, and then perform retransmission based on HARQ information (for example, a redundancy version), and does not need to perform packet assembly.

For dynamic scheduling, a HARQ ID to which data belongs may be directly indicated by the DCI. For pre-configured scheduling, a HARQ ID of each resource may be calculated based on a time domain location and/or a frequency domain location of the resource. The retransmission of the dynamic scheduling may be dynamic scheduling, and the retransmission of the pre-configured scheduling may also be dynamic scheduling. In other words, the pre-configured scheduling is usually used only for initial transmission of data, and is not used for retransmission.

For the pre-configured scheduling, a configured timer may be introduced. After sending a piece of data on a pre-configured scheduling resource, the terminal device starts the timer. During running of the timer, the terminal device cannot send data by using a pre-configured scheduling resource that belongs to a HARQ process and that is the same as the pre-configured scheduling resource on which the data is sent. Based on the foregoing description, because the pre-configured scheduling is usually used only for the initial transmission of the data, if a previous piece of data has not been successfully transmitted, or is still waiting for a feedback from the network device, and a new pre-configured scheduling resource that belongs to a same HARQ process arrives, the terminal device performs new transmission, and a new data packet overwrites an old data packet. As a result, the network device may not have a chance to retransmit the previous data. In other words, the timer is configured to give the network device a processing time period and a feedback time period. After the timer expires, the terminal device may determine that the network device does not schedule retransmission, and may further use a resource corresponding to the HARQ ID. Each HARQ process may maintain one timer, in other words, one timer only be used on a pre-configured scheduling resource of a HARQ process corresponding to the timer, but cannot be used on a pre-configured scheduling resource of another HARQ process.

(6) Repetition Mechanism

Figure 2A:
FIG. 2A to FIG. 2C each are a possible schematic diagram of a repetition mechanism.
Figure 2A:
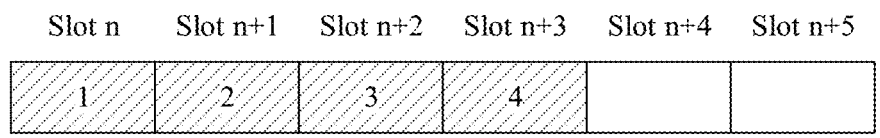
Figure 2B:
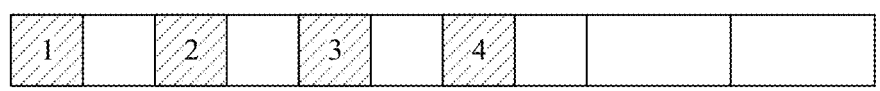
Figure 2C:
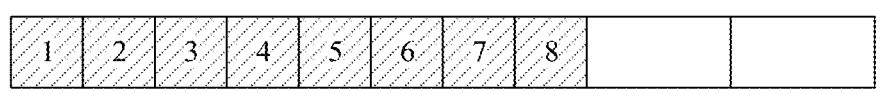

For a resource, if the repetition mechanism is configured for the terminal device, the terminal device automatically considers by default that there are resources of a same size and a same location at K subsequent time points, and the terminal device repeatedly sends data on these resources for K times. In other words, the terminal device automatically retransmits the data. Herein, K is also configured by a network device. FIG. 2A, FIG. 2B, and FIG. 2C each are a possible schematic diagram of a repetition mechanism.

Based on the foregoing description, the following describes the embodiments of this application in detail with reference to specific embodiments.

In a 5G communications system, to maintain an uplink single-carrier feature, a terminal device usually cannot send UCI (including an SR) on a PUCCH and send data information on a PUSCH at a same time. However, when the terminal sends the UCI to the network device on the PUCCH, there may be a conflict between a transmission time period of the PUCCH and a transmission time period of the PUSCH. In other words, the transmission time period of the UCI overlaps with the transmission time period of data information on the PUSCH. For example, the conflict between the transmission time period of the PUCCH and the transmission time period of the PUSCH in the embodiments of this application is mainly for a scenario in which a transmission time period conflict occurs between the PUCCH and the PUSCH that are transmitted on a same carrier.

For the conflict between the transmission time period of the PUCCH and the transmission time period of the PUSCH, a possible solution is as follows: When the PUCCH carrying the SR and the PUSCH overlap in time domain of an uplink resource, the terminal device always sends the PUSCH but does not send the SR. A reason is that before the terminal device assembles, at a MAC layer, a data packet (namely, a MAC PDU) to be transmitted on the PUSCH, if the terminal device determines that there is the SR that needs to be transmitted, the terminal device may assemble, at the MAC layer into the data packet, a BSR triggering the SR. In other words, the data packet sent by the PUSCH may include the BSR. The BSR is used to reflect an amount of to-be-sent data of each logical channel group in the terminal device at a current moment, and the network device may subsequently perform effective scheduling based on the BSR.

However, in an example, if the PUSCH that overlaps with the PUCCH carrying the SR in time domain is a retransmission resource, the data packet transmitted on the PUSCH cannot reflect the amount of to-be-sent data of the terminal device at the current moment. Therefore, the SR is sent on a next available SR transmission occasion after the PUSCH is sent. If data triggering the SR is URLLC service data, but data in the data packet transmitted on the PUSCH is eMBB service data, a latency of the URLLC service data cannot be reduced.

In still another example, if the SR triggered by the URLLC service data occurs after the MAC PDU of the eMBB service data is assembled, the MAC PDU sent by the PUSCH cannot reflect that there is URLLC service data to be sent. In other words, a BSR included in the MAC PDU cannot reflect a latest status of the URLLC service data. Therefore, the SR is sent on a next available SR transmission occasion after the PUSCH is sent. Consequently, a latency of the URLLC service data cannot be reduced.

In still another example, if the SR triggered by the URLLC service data occurs before the MAC PDU of the eMBB service data is assembled, the MAC PDU sent by the PUSCH may include a BSR, and may reflect a status of the URLLC service data. In this case, the PUSCH may indicate the URLLC service data to wait for scheduling by the network device. However, reliability of a PUSCH resource for scheduling the eMBB service data may not meet a resource requirement of the URLLC service data, and the PUSCH is very likely to schedule the eMBB service data based on a slot (to be specific, a ms granularity). Consequently, a latency of the URLLC service data cannot be reduced.

Based on this, an embodiment of this application provides a communications method, to resolve data sending when a PUCCH carrying an SR and a PUSCH overlap in time domain of an uplink resource. Refer to Embodiment 1 and Embodiment 2.

Embodiment 1

Figure 3:
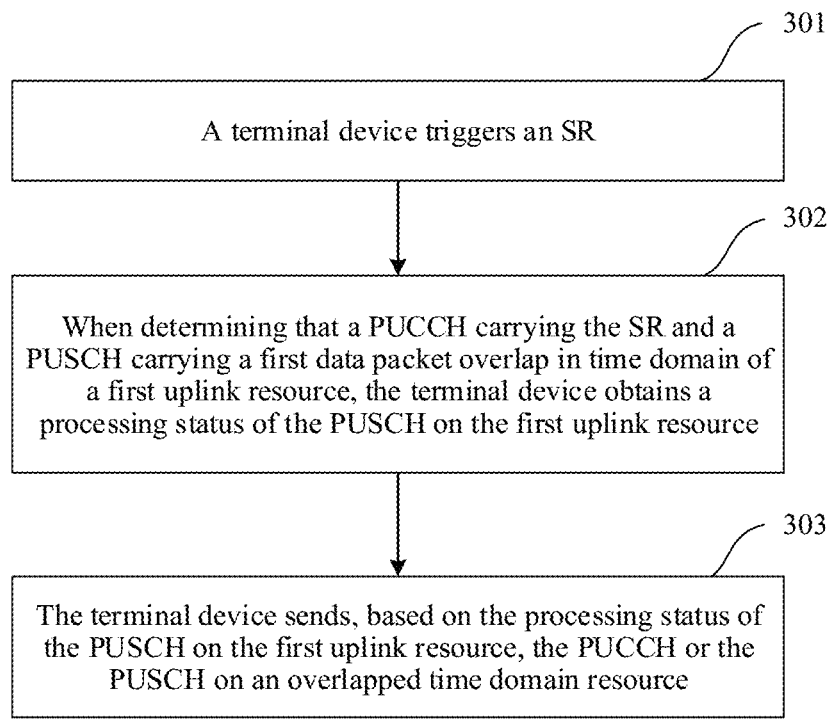
FIG. 3 is a schematic flowchart corresponding to a communications method according to Embodiment 1 of this application.

FIG. 3 is a schematic flowchart corresponding to a communications method according to Embodiment 1 of this application. As shown in FIG. 3, the method includes the following steps.

Step 301: A terminal device triggers an SR.

For example, when the terminal device has new data to be sent but no logical channel has to-be-sent data or a logical channel with a higher priority has to-be-sent data, the terminal device may trigger a BSR, to further trigger an SR corresponding to the BSR. For details, refer to the foregoing related descriptions of the SR triggering.

Step 302: If determining that a PUCCH carrying the SR and a PUSCH carrying a first data packet overlap in time domain of a first uplink resource, where the overlapping includes partially overlapping and completely overlapping, the terminal device obtains a processing status of the PUSCH on the first uplink resource. A PUSCH resource may be a dynamically scheduled resource or a pre-configured scheduled resource. This is not specifically limited. The first data packet carried on the PUSCH may also be understood as a to-be-transmitted data packet on the first uplink resource.

Figure 4A:
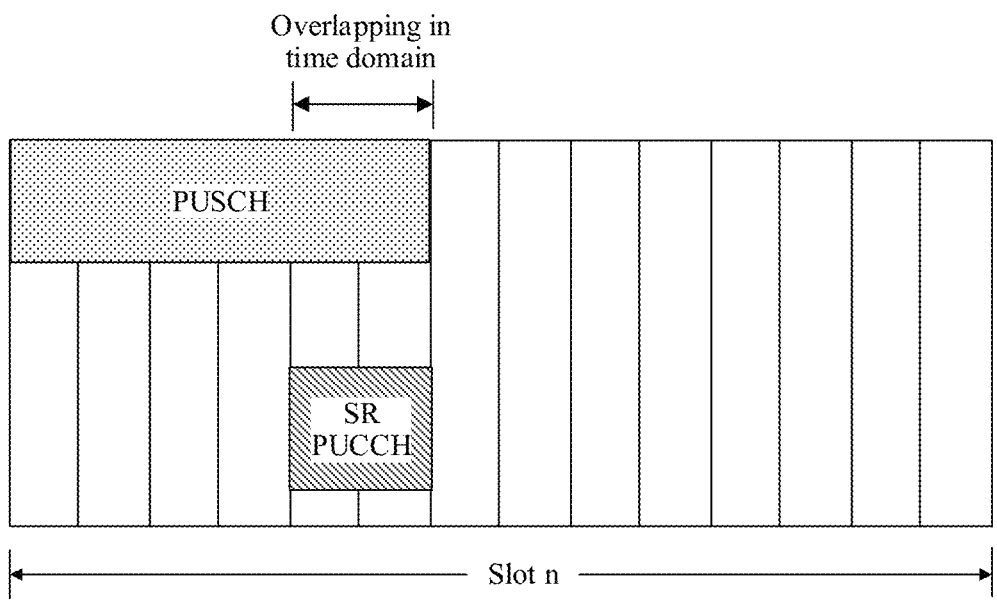
FIG. 4A is an example in which a PUCCH and a PUSCH overlap in time domain of a first uplink resource according to an embodiment of this application.

In this embodiment of this application, there may be a plurality of cases in which the PUCCH and the PUSCH overlap in time domain of the first uplink resource. For example, referring to FIG. 4A, a PUSCH resource is located in a slot n, and a time domain length is six symbols. If a start symbol of the slot n is a symbol 1, it may be considered that the PUSCH resource occupies the symbol 1 to a symbol 6. The PUCCH resource is also located in the slot n, a time domain length is two symbols, and the PUCCH resource occupies a symbol 5 and the symbol 6. In this case, the PUCCH and the PUSCH overlap in the symbol 5 and the symbol 6. For another example, referring to FIG. 4B, a PUSCH resource is located in a slot n, a time domain length is six symbols, and the PUSCH resource occupies a symbol 1 to a symbol 6. The PUCCH resource is also located in the slot n, a time domain length is two symbols, and the PUCCH resource occupies the symbol 1 and a symbol 2. In this case, the PUCCH and the PUSCH overlap in the symbol 1 and the symbol 2.

In an example, the first uplink resource may include, in time domain, a time domain resource on which the PUCCH and the PUSCH overlap. In other words, from a perspective of the time domain, the overlapping time domain resource may be understood as a part of resources indicated by an uplink grant corresponding to the PUSCH. For example, referring to FIG. 4A, a resource indicated by an uplink grant corresponding to a PUSCH includes a symbol 1 to a symbol 6 in time domain, and an overlapping time domain resource may include a symbol 5 and a symbol 6. For another example, referring to FIG. 4B, the resource indicated by the uplink grant corresponding to the PUSCH includes the symbol 1 to the symbol 6 in time domain, and the overlapping time domain resource may include the symbol 1 and the symbol 2.

Figure 4B:
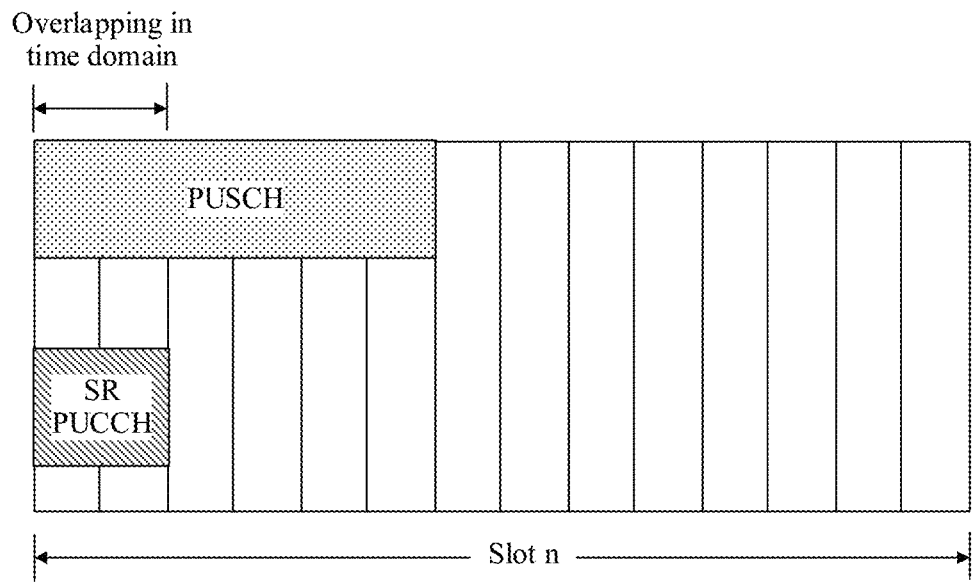
FIG. 4B is another example in which a PUCCH and a PUSCH overlap in time domain of a first uplink resource according to an embodiment of this application.

It should be noted that sending the PUCCH on the overlapping time domain resource in this embodiment of this application may be understood as sending the PUCCH on the symbol 5 and the symbol 6 (FIG. 4A) or sending the PUCCH on the symbol 1 and the symbol 2 (FIG. 4B). In this embodiment of this application, the first uplink resource may be understood as the resource indicated by the uplink grant corresponding to the PUSCH. For example, the processing status of the PUSCH on the first uplink resource may be understood as a processing status of the resource indicated by the uplink grant corresponding to the PUSCH. For another example, the first data packet to be transmitted on the first uplink resource may be understood as a data packet to be transmitted on the resource indicated by the uplink grant corresponding to the PUSCH.

In this embodiment of this application, the processing status of the PUSCH on the first uplink resource may include processing completed and processing uncompleted. For example, that the processing status of the PUSCH on the first uplink resource is processing completed may mean at least one of the following cases: (1) The first data packet (namely, a MAC PDU) to be transmitted on the first uplink resource has been assembled, in other words, the first packet has been obtained by using a multiplexing and assembly entity, or an LCP process has been completed or is being performed. The LCP process may be understood as a process of selecting a logical channel based on an LCP mapping restriction, or a process of assembling to-be-sent data of a selected logical channel after the logical channel is selected; (2) the uplink grant and/or the first data packet corresponding to the PUSCH have/has been delivered to a HARQ entity; (3) the uplink grant and/or the first data packet corresponding to the PUSCH have/has delivered to a HARQ process; (4) the first data packet has been delivered to a physical layer; (5) the uplink grant corresponding to the PUSCH is used to indicate uplink retransmission or repetition; (6) the first data packet is a retransmitted data packet; and (7) the first data packet is being transmitted.

For example, that the processing status of the PUSCH on the first uplink resource is processing uncompleted may mean at least one of the following cases: (1) The first data packet to be transmitted on the first uplink resource is not assembled, in other words, the first data packet is not obtained by using the multiplexing and assembly entity; (2) the uplink grant and/or a first data packet corresponding to the PUSCH have/has not been delivered to the HARQ entity; (3) the uplink grant and/or a first data packet corresponding to the PUSCH have/has not been delivered to the HARQ process; (4) the first data packet has not been delivered to the physical layer; (5) the first data packet to be transmitted on the first uplink resource is not obtained, in other words, the first data packet is skipped. For example, the terminal has no to-be-sent data and allows dynamic ignoring of the uplink grant; and (6) the first data packet has not started to be transmitted or has not been transmitted completely.

It should be noted that, for a case in which the processing status of the PUSCH on the first uplink resource is processing completed or processing uncompleted, the foregoing listed cases are merely some examples. In specific implementation, another possible case may be further included. This is not limited in this embodiment of this application.

Step 303: The terminal device sends, based on the processing status of the PUSCH on the first uplink resource, the PUCCH or the PUSCH on the overlapping time domain resource.

Herein, because the processing status of the PUSCH on the first uplink resource may include processing completed and processing uncompleted, the following separately describes implementations in the two processing statuses in detail.

(1) The processing status of the PUSCH on the first uplink resource is processing completed.

In this case, the terminal device may send the PUCCH or the PUSCH by comparing a first priority (Priority-SR) of a logical channel for triggering the SR with a second priority (Priority-PUSCH) of a logical channel of the first data packet.

For example, the terminal device may send the PUCCH or the PUSCH in an inter-layer indication manner. There may be a plurality of inter-layer indication manners. In a possible implementation, the terminal device may compare the first priority with the second priority at a MAC layer, determine, based on a comparison result, to send the PUCCH or the PUSCH, and send indication information 1 to the physical layer, so that the terminal device may send the PUCCH or the PUSCH at the physical layer based on the indication information 1. In still another possible implementation, the terminal device may notify the physical layer of the first priority and the second priority at the MAC layer, then compare the first priority with the second priority at the physical layer, and determine, based on the comparison result, to send the PUCCH or the PUSCH. There may be a plurality of implementations in which the terminal device notifies the physical layer of the first priority and the second priority at the MAC layer. For example, the MAC layer may send indication information 2 to the physical layer, where the indication information 2 is used to indicate the first priority and the second priority. In specific implementation, the terminal device may select any one of the foregoing possible implementations. This is not specifically limited.

In this embodiment of this application, the logical channel of triggering the SR may be understood as the logical channel of triggering the BSR corresponding to the SR. For example, when the terminal device has URLLC service data to be sent, the BSR and the SR corresponding to the BSR are triggered. In this case, the logical channel of triggering the BSR corresponding to the SR is a logical channel carrying the URLLC service data.

In this embodiment of this application, the second priority may be understood as a highest priority of the logical channel of the first data packet. A logical channel of the first data packet may be understood as a logical channel carrying data in the first data packet. For example, the first data packet includes URLLC service data 1 and URLLC service data 2. In this case, the logical channel of the first data packet may include a logical channel carrying the URLLC service data 1 and a logical channel carrying the URLLC service data 2. Specifically, if there is only one logical channel of the first data packet, the second priority may be a priority of the logical channel. If the first data packet has a plurality of logical channels, the second priority may be understood as a highest priority of the plurality of logical channels. For example, if the logical channel of the first data packet includes an LCH #1 (carrying the URLLC service data 1) and an LCH #2 (carrying the URLLC service data 2), and a priority of the LCH #1 is higher than a priority of the LCH #2, the second priority may be the priority of the LCH #1.

The second priority may be obtained when the terminal device assembles the first data packet, for example, may be obtained when the terminal device performs the LCP process. For example, when assembling the first data packet, the terminal device determines, based on a PUSCH resource and a resource requirement of a logical channel, that logical channels that can be mapped to the PUSCH resource are the LCH #1 and the LCH #2, and then may determine the second priority based on the priority of the LCH #1 and the priority of the LCH #2. Further, the terminal device may record the second priority. For example, the terminal device may use the second priority as a part of HARQ information of a HARQ process corresponding to the first uplink resource, a MAC entity transmits the second priority to the HARQ entity, and the HARQ entity may further transmit the second priority to the HARQ process. In this way, when the first data packet is a retransmitted data packet (in other words, in a retransmission scenario), the terminal device may obtain the recorded second priority based on the HARQ process. In other words, in this embodiment of this application, after obtaining the second priority by assembling the first data packet, the terminal device may record the second priority, so that the second priority can be obtained in a subsequent retransmission scenario. The terminal device may record the second priority in a plurality of specific implementations. This is not limited in this embodiment of this application.

In an example, if determining that the first priority is higher than the second priority, the terminal device may send the PUCCH on the first uplink resource. Specifically, if determining, at the MAC layer, that the first priority is higher than the second priority, the terminal device sends first indication information to the physical layer of the terminal device. In this way, the terminal device may send the PUCCH at the physical layer based on the first indication information. Alternatively, the terminal device notifies the physical layer of the terminal device of the first priority and the second priority at the MAC layer. In this way, if determining that the first priority is higher than the second priority at the physical layer, the terminal device sends the PUCCH.

For example, that the terminal device sends the PUCCH on the first uplink resource may be understood as that the terminal device sends only the PUCCH but does not send the PUSCH on the first uplink resource; or the terminal device preferentially sends the PUCCH on the first uplink resource, and if the first uplink resource still has a remaining available resource, the terminal device may further send some information of the first data packet. For example, the terminal device may send the PUCCH through puncturing or PUSCH pre-emption.

For example, if the PUSCH has not been sent on the first uplink resource, the terminal device may choose to drop, at the physical layer, a TB corresponding to the PUSCH, and send the PUCCH. In this case, the terminal device sends only the PUCCH but does not send the PUSCH on the first uplink resource. If the PUSCH has been sent on the first uplink resource, the terminal device may send the PUCCH through puncturing, PUSCH pre-emption, or the like. After the SR is completely sent, sending of the PUSCH may be resumed, or sending of the PUSCH may not be resumed.

In this example, because the first priority is higher than the second priority, the terminal device sends the PUCCH on the first uplink resource, so that a network device can schedule, in time by using the PUCCH, to-be-sent data of triggering the SR, to effectively reduce a latency of the to-be-sent data.

In another example, if determining that the first priority is equal to the second priority, the terminal device may send the PUCCH on the overlapping time domain resource, or send the PUSCH on the overlapping time domain resource, or the terminal device selects, based on a processing capability of the terminal device, to send the PUCCH or the PUSCH.

In another example, if determining that the first priority is lower than the second priority, the terminal device may send the PUSCH on the first uplink resource (including the overlapping time domain resource). Herein, sending the PUSCH on the first uplink resource may be understood as that the terminal device sends only the PUSCH but does not send the PUCCH on the first uplink resource. In this example, because the first priority is lower than the second priority, the terminal device sends the PUSCH on the first uplink resource, so that a latency of data transmitted on the PUSCH can be reduced.

(2) The processing status of the PUSCH on the first uplink resource is processing uncompleted.

In this case, the terminal device may determine, by comparing the first priority and the second priority, to send the PUCCH or the PUSCH.

In an example, if the terminal device determines that the first priority is higher than the second priority, the terminal device may send the PUCCH on the overlapping time domain resource. The second priority may be obtained by the terminal device when the terminal device assembles the first data packet.

In still another example, if determining that the first priority is equal to the second priority, the terminal device may send the PUCCH on the overlapping time domain resource, or send the PUSCH on the first uplink resource, or the terminal device selects, based on a processing capability of the terminal device, to send the PUCCH or the PUSCH.

For example, if the terminal device determines to send the PUCCH, the MAC layer of the terminal device may choose to drop the uplink grant corresponding to the PUSCH. In this case, the terminal device sends only the PUCCH on the overlapping time domain resource, but does not send the PUSCH.

In still another example, if determining that the first priority is lower than the second priority, the terminal device may send the PUSCH on the first uplink resource (including the overlapping time domain resource).

According to the foregoing method, when the PUCCH carrying the SR and the PUSCH overlap in time domain of the first uplink resource, the terminal device considers the processing status of the PUSCH on the first uplink resource, and sends the PUCCH or the PUSCH on the overlapping time domain resource based on the processing status of the PUSCH on the first uplink resource, so that reasonableness of data transmission can be ensured (for example, the latency of the to-be-sent data triggering the SR or the latency of the data transmitted on the PUSCH can be reduced), and a problem that the latency of the data cannot be reduced because the terminal device always sends the PUSCH can be avoided.

Embodiment 2

Figure 5:
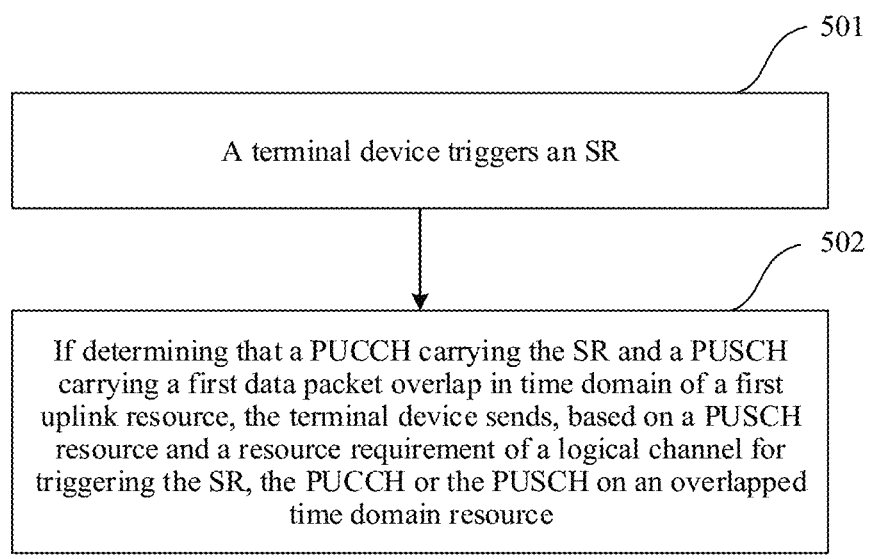
FIG. 5 is a schematic flowchart corresponding to a communications method according to Embodiment 2 of this application.

FIG. 5 is a schematic flowchart corresponding to a communications method according to Embodiment 2 of this application. As shown in FIG. 5, the method includes the following steps.

Step 501: A terminal device triggers an SR.

Step 502: If determining that a PUCCH carrying the SR and a PUSCH overlap in time domain of a first uplink resource, the terminal device sends, based on a PUSCH resource and a resource requirement of a logical channel for triggering the SR, the PUCCH or the PUSCH on an overlapping time domain resource. The PUSCH resource may be a dynamically scheduled resource or a pre-configured scheduled resource. This is not specifically limited.

According to the foregoing method, when the PUCCH carrying the SR and the PUSCH overlap in time domain of the first uplink resource, the terminal device considers the PUSCH resource and the resource requirement of the logical channel for triggering the SR, and may determine, based on the PUSCH resource and the resource requirement of the logical channel for triggering the SR, to send the PUCCH or the PUSCH on the overlapping time domain resource. This ensures efficiency of sending uplink information on the overlapping time domain resource. Because the PUSCH resource and the resource requirement of the logical channel for triggering the SR are information configured by a network device and are not affected by a scenario, the foregoing method has relatively strong applicability and may be applicable to a plurality of possible scenarios, for example, a new data transmission scenario or a data retransmission scenario.

Specifically, in an example, if determining that the PUSCH resource does not meet the resource requirement of the logical channel for triggering the SR, the terminal device may send the PUCCH on the overlapping time domain resource. In this example, that the PUSCH resource does not meet the resource requirement of the logical channel for triggering the SR indicates that data triggering the SR cannot be sent on the PUSCH resource. For example, the data triggering the SR is URLLC service data, and the PUSCH resource is a resource for scheduling eMBB service data. Therefore, the PUSCH resource does not meet the resource requirement of the logical channel for triggering the SR (or in other words, an LCP mapping restriction of the logical channel for triggering the SR). For example, if determining that a time-domain length of the PUSCH resource is greater than a requirement of the logical channel for triggering the SR for a time-domain length of the resource, in other words, the time-domain length of the PUSCH resource is greater than the requirement of the logical channel for triggering the SR for a maximum time-domain length of the resource, the terminal device determines that the PUSCH resources cannot meet the resource requirement of the logical channel for triggering the SR.

In this example, because the PUSCH resource does not meet the resource requirement of the logical channel for triggering the SR, the terminal device sends the PUCCH on the first uplink resource, so that a network device can schedule, in time by using the PUCCH, to-be-sent data triggering the SR, to effectively reduce a latency of the to-be-sent data.

In another example, if determining that the PUSCH resource meets the resource requirement of the logical channel for triggering the SR, the terminal device sends the PUSCH. In this example, that the PUSCH resource meets the resource requirement of the logical channel for triggering the SR indicates that the data triggering the SR may be sent on the PUSCH resource. In this case, the PUSCH may be sent.

It should be noted that: (1) A difference between Embodiment 1 and Embodiment 2 lies in that: in Embodiment 1, sending of the PUCCH or the PUSCH is determined based on the processing status, and in Embodiment 2, sending of the PUCCH or the PUSCH is determined based on the PUSCH resource and the resource requirement of the logical channel for triggering the SR. In addition to this difference, other content may be cross-referenced.

(2) Embodiment 1 and Embodiment 2 may be separately implemented, or may be implemented in combination. That Embodiment 1 and Embodiment 2 are implemented in combination may be understood as follows: Whether the PUSCH resource meets the resource requirement of the logical channel for triggering the SR is first determined, then the first priority of the logical channel for triggering the SR and the second priority of the logical channel of the first data packet to be transmitted on the first uplink resource are compared based on the processing status, and the PUCCH or PUSCH is then sent based on the comparison result.

In an example, that Embodiment 1 and Embodiment 2 are implemented in combination may indicate that: If determining that the resource occupied by the PUSCH meets the resource requirement of the logical channel for triggering the SR, the terminal device may further compare the first priority with the second priority based on the processing status, and send the PUCCH on the overlapping time domain resource if the first priority is higher than the second priority, or send the PUSCH if the first priority is lower than the second priority, or send the PUCCH or the PUSCH on the overlapping time domain resource if the first priority is equal to the second priority. For a specific implementation in which the terminal device compares the first priority and the second priority based on the processing status, refer to the description in Embodiment 1. In this way, after determining that the PUSCH resource meets the resource requirement of the logical channel for triggering the SR, the terminal device further determines, based on a priority comparison result, to send the PUCCH or the PUSCH, so that when the PUSCH resource meets the resource requirement of the logical channel for triggering the SR but the first priority is higher than the second priority, the terminal device still sends the PUCCH. This effectively avoids a problem that determining is not accurate enough only based on the PUSCH resource and the resource requirement of the logical channel for triggering the SR, and reduces a latency of to-be-sent data triggering the SR. For example, the PUSCH resource is a resource for scheduling URLLC service data 1, and a time domain length of the PUSCH resource is 0.2 ms. The to-be-sent data triggering the SR is URLLC service data 2, and a requirement of the logical channel for triggering the SR on a time domain length of the resource is 0.5 ms. In this case, the PUSCH resource meets the resource requirement of the logical channel for triggering the SR. If a priority (namely, the first priority) of a logical channel carrying the URLLC service data 2 is higher than a priority (namely, the second priority) of a logical channel carrying the URLLC service data 1, a PUCCH may still be sent. In this way, a latency of the URLLC service data 2 is reduced.

Embodiment 3

In Embodiment 3, some solutions are mainly provided for a scenario in which a first data packet in a PUSCH (namely, a to-be-transmitted data packet on a resource indicated by an uplink grant corresponding to the PUSCH) cannot be effectively transmitted, to provide an occasion for transmitting the first data packet again, to avoid a first data packet loss or relatively large service performance loss of the first data packet. That the first data packet on the PUSCH cannot be effectively transmitted may include that the first data packet on the PUSCH is not sent or is not completely sent.

In this embodiment of this application, there may be a plurality of scenarios in which the first data packet in the PUSCH cannot be effectively transmitted. For example, when a PUCCH carrying an SR and the PUSCH overlap in time domain of a first uplink resource, if the terminal device sends the PUCCH on the first uplink resource, the first data packet on the PUSCH may fail to be effectively transmitted. For example, if the PUSCH is a scheduled new transmission resource, when the terminal device has assembled the first data packet on the PUSCH, and if the terminal device chooses to send the PUCCH but does not send the PUSCH, the network device cannot determine that the PUSCH is not sent because the terminal device has no data to be sent and chooses to skip the PUSCH resource, or because the first data packet of the PUSCH is dropped or pre-empted when the SR that overlaps in time domain is sent. Therefore, the network device cannot schedule, in time, the first data packet on the PUSCH for retransmission. When a HARQ process corresponding to the PUSCH is occupied by the network device and new transmission scheduling is performed, it means that the first data packet is replaced with a newly assembled data packet. In this case, when the terminal device has no data to be sent on the PUSCH in the HARQ process, and chooses to skip the PUSCH resource, the terminal device actively clears a buffer of the HARQ process. In other words, the first data packet is cleared. Consequently, the first data packet cannot obtain a HARQ transmission occasion any more. If data in the first data packet is transmitted in an unacknowledged mode (UM) at a radio link control (RLC) layer, in other words, if there is no RLC layer ARQ mechanism, the data in the first data packet is lost. If the data in the first data packet is transmitted in an AM mode in the first data packet at the RLC layer, in other words, if there is an RLC layer ARQ mechanism, depending on the RLC ARQ also causes an excessively long latency. When the data in the first data packet is a URLLC service with a relatively low priority, the latency cannot be reduced.

For another example, the network device may configure a measurement interval for the terminal device. Correspondingly, the terminal device may measure channel quality of different frequency domain resources within the measurement interval, and report the channel quality (for example, the channel quality may be a channel quality indicator (CQI)) to the network device. In this way, the network device can schedule data on a frequency domain resource with good channel quality, to obtain a frequency domain scheduling gain. Because the terminal device is not allowed to send the PUSCH in the measurement interval, a PUSCH transmission occasion is knocked off by the measurement interval. As a result, the first data packet on the PUSCH cannot be effectively transmitted.

For another example, the terminal device simultaneously communicates with another terminal device. If a priority of a second uplink grant for communication between the terminal device and the another terminal device is higher than that of a first uplink grant for communication between the terminal device and the network device, the terminal device selects the second uplink grant, and does not transmit data in the first data packet on the PUSCH corresponding to the first uplink grant.

(1) A possible solution provided in Embodiment 3 of this application is as follows: The terminal device assembles the first data packet to be transmitted on the first uplink resource, and transmits the first data packet on a second uplink resource if determining that the first data packet is not sent or is not completely sent. The second uplink resource and the first uplink resource may correspond to a same HARQ process, in other words, the second uplink resource and the first uplink resource have a same HARQ process identifier. In this way, the first data packet is sent on the second uplink resource, so that the network device can receive the first data packet, to effectively avoid the loss of the data in the first data packet. It should be noted that the first data packet transmitted on the second uplink resource may be a complete MAC PDU assembled on the first uplink resource. In other words, even if some information in the first data packet is sent on the first uplink resource, the first data packet transmitted on the second uplink resource may also be a complete MAC PDU.

Figure 6:
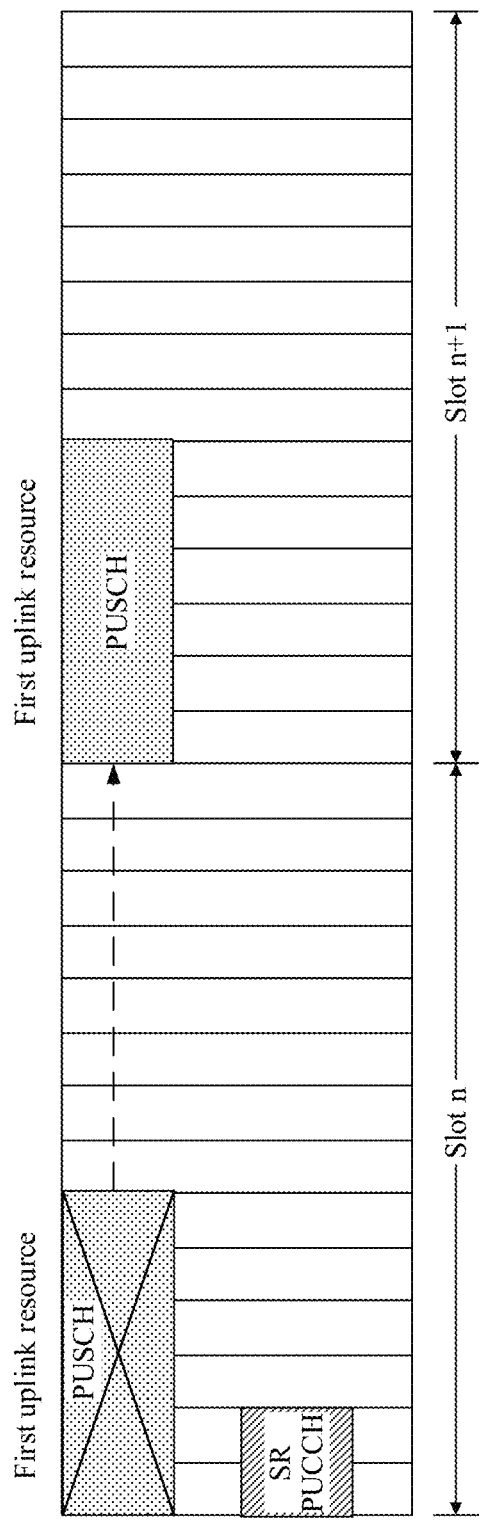
FIG. 6 is a schematic diagram of sending a first data packet on a second uplink resource.

In an example, the second uplink resource may be a next uplink resource following the first uplink resource. As shown in FIG. 6, both the first uplink resource and the second uplink resource are pre-configured scheduling resources. The first uplink resource is an uplink resource of a HARQ ID #1. The first data packet is obtained when the first data packet has been assembled, but the first data packet is dropped or preempted. Because the uplink resource is a periodic resource (repeated once in each slot), if an uplink resource of a next HARQ ID #1 is available (namely, the second uplink resource), the first data packet may be sent by using the second uplink resource.

For example, the first data packet is stored in a buffer of the HARQ process corresponding to the second uplink resource, so that the first data packet can be transmitted on the second uplink resource. Alternatively, there is no existing data to be sent on the second uplink resource, in other words, the second uplink resource does not obtain a new MAC PDU by using a multiplexing and packet assembly entity, so that the first data packet can be transmitted on the second uplink resource.

(2) Another possible solution provided in Embodiment 3 of this application is as follows: The terminal device assembles a first data packet to be transmitted on the first uplink resource, and transmits a second data packet on a second uplink resource if determining that the first data packet is not sent or is not completely sent, where the second data packet includes some or all of information in the first data packet. The second uplink resource and the first uplink resource may correspond to a same HARQ process. In an example, the second uplink resource may be a next uplink resource following the first uplink resource. The second data packet may include some or all of information in the first uplink data packet when the terminal device performs packet assembly on the second uplink resource, in other words, the terminal device may perform data reassembly (MAC PDU rebuilding) on the second uplink resource.

In an example, a MAC entity may indicate a multiplexing and packet assembly entity to assemble the second data packet. The first data packet may include at least one MAC sub PDU and a MAC control element (CE). That the second data packet includes some or all of information in the first data packet may be understood as that the second data packet includes at least one MAC sub-PDU in the first data packet, or the second data packet includes a MAC CE in the first data packet, or the second data packet includes at least one MAC sub-PDU and a MAC CE in the first data packet. This is not limited in this embodiment of this application.

For example, if the first data packet includes at least one MAC CE, for example, a BSR MAC CE or a power headroom report (PHR) MAC CE, a MAC process corresponding to the at least one MAC CE is not canceled after the first data packet is assembled, in other words, the terminal device may re-trigger, at a MAC layer, the MAC process corresponding to the at least one MAC CE, so that the second data packet may include the MAC CE generated in the MAC process corresponding to the at least one MAC CE, for example, the BSR MAC CE or the PHR MAC CE.

(3) Another possible solution provided in Embodiment 3 of this application is as follows: If data in the first data packet is transmitted in an AM mode at an RLC layer, a MAC sub-PDU in the first data packet may indicate the RLC layer to trigger retransmission of the RLC layer ARQ.

(4) Another possible solution provided in Embodiment 3 of this application is as follows: The terminal device assembles the first data packet to be transmitted on the first uplink resource, and may send third indication information to the network device if determining that the first data packet is not sent or is completely sent, where the third indication information is used to indicate that the first data packet is not sent or is not completely sent. Correspondingly, after receiving the third indication information, the network device may schedule retransmission of the first data packet based on the third indication information, to avoid the loss of the data in the first data packet.

In an example, for a scenario in which the PUCCH carrying the SR and the PUSCH overlap in time domain of the first uplink resource, the network device may pre-configure two types of SR configurations. A first type of SR configuration includes an available PUCCH resource, and a second type of SR configuration includes an available PUCCH resource and a resource carrying the third indication information. If determining to send the PUCCH on the first uplink resource, the terminal device may send the PUCCH and the third indication information by using the second type of SR configuration.

In still another example, the third indication information may be additional information carried on the PUCCH carrying the SR. The additional information may be an additional bit. For example, if the bit is set to 1, it indicates that the first data packet is not sent or is not completely sent.

It should be noted that various possible solutions described in Embodiment 3 may be separately implemented, or may be implemented in combination with Embodiment 1 or Embodiment 2. For example, in Embodiment 1 or Embodiment 2, if the terminal device sends the PUCCH on the first uplink resource, when the first data packet is not sent or is not completely sent, the foregoing solution may be used to provide an occasion for the first data packet to be transmitted again, to avoid a first data packet loss or relatively large service performance loss of the first data packet.

Embodiment 4

In this embodiment of this application, when a plurality of logical channels have to-be-sent data at the same time, a terminal device may trigger a plurality of BSRs. For example, if URLLC service data and eMBB service data are to be sent, the terminal device may trigger a BSR 1 corresponding to the URLLC service data and a BSR 2 corresponding to the eMBB service data. In this case, a PUCCH carrying an SR 1 corresponding to the BSR 1 and a PUCCH carrying an SR 2 corresponding to the BSR 2 overlap in time domain of an uplink resource. If the terminal device triggers the SR 2 corresponding to the BSR 2 but does not trigger the SR 1 corresponding to the BSR 1, a network device may schedule, based on the SR 2, a resource unsuitable for the URLLC service data. Consequently, a latency of the URLLC service data cannot be reduced.

Based on this, a solution provided in Embodiment 4 of this application is as follows: The terminal device triggers a plurality of BSRs, and the plurality of BSRs respectively correspond to a plurality of SRs. If determining that a plurality of PUCCHs carrying the plurality of SRs overlap in time domain of a third uplink resource, the terminal device may determine a target BSR based on priorities of logical channels for triggering the plurality of BSRs, and trigger an SR corresponding to the target BSR. A priority of a logical channel for triggering the target BSR is higher than a priority of a logical channel for triggering another BSR in the plurality of BSRs. For example, the terminal device triggers the BSR 1 corresponding to the URLLC service data and the BSR 2 corresponding to the eMBB service data. Because a priority of a logical channel for triggering the BSR 1 is higher than a priority of a logical channel for triggering the BSR 2, the terminal device may trigger the SR 1 corresponding to the BSR 1, to reduce the latency of the URLLC service data.

In an example, if the logical channels for triggering the plurality of BSRs have a same priority, the terminal device may select a to-be-triggered SR based on another factor. For example, the terminal device may select the to-be-triggered SR based on arrival time points of transmission opportunities of the plurality of SRs corresponding to the plurality of BSRs. For example, the terminal device triggers the BSR 1 corresponding to the URLLC service data and the BSR 2 corresponding to the eMBB service data. If a transmission occasion of the SR 1 corresponding to the BSR 1 arrives first, the terminal device may trigger the SR 1.

It should be noted that the solution described in Embodiment 4 may be implemented separately, or may be implemented in combination with Embodiment 1 or Embodiment 2. For example, in Embodiment 1 or Embodiment 2, if the terminal device triggers the plurality of BSRs, the triggered SR may be determined based on the foregoing solution.

The foregoing mainly describes the solutions provided in the embodiments of this application from a perspective of interaction between the network device and the terminal device. It may be understood that, to implement the foregoing functions, the network device or the terminal device may include a corresponding hardware structure and/or software module for performing each function. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 7:
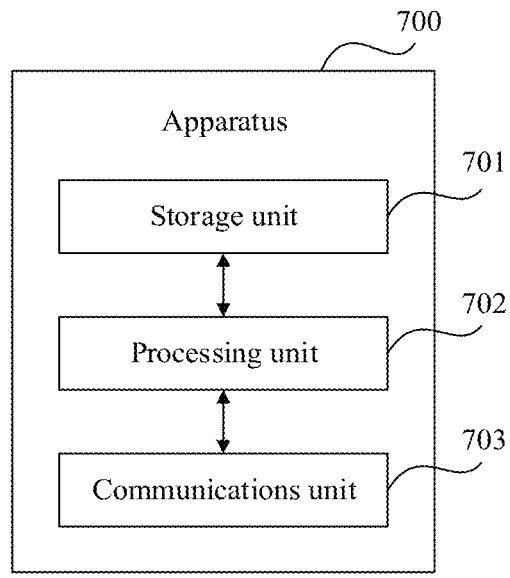
FIG. 7 is a possible example block diagram of an apparatus according to an embodiment of this application.

When an integrated unit (module) is used, FIG. 7 is a possible example block diagram of an apparatus according to an embodiment of this application. The apparatus 700 may exist in a form of software. The apparatus 700 may include a processing unit 702 and a communications unit 703. The processing unit 702 is configured to control and manage an action of the apparatus 700. The communications unit 703 is configured to support the apparatus 700 in communicating with another network entity. Optionally, the communications unit 703 is also referred to as a transceiver unit, and may include a receiving unit and/or a sending unit, which are respectively configured to perform a receiving operation and a sending operation. The apparatus 700 may further include a storage unit 701, configured to store program code and/or data of the apparatus 700.

The processing unit 702 may be a processor or a controller, and may implement or execute various example logical blocks, modules, and circuits described with reference to content disclosed in the embodiments of this application. The communications unit 703 may be a communications interface, a transceiver, a transceiver circuit, or the like. The communications interface is a general term. In specific implementation, the communications interface may include a plurality of interfaces. The storage unit 701 may be a memory.

The apparatus 700 may be the terminal device in any one of the foregoing embodiments, or may be a chip disposed in the terminal device. The processing unit 702 may support the apparatus 700 in performing an action of the terminal device in the foregoing method examples. Alternatively, the processing unit 702 mainly performs internal actions of the terminal in the method examples, and the communications unit 703 may support communication between the apparatus 700 and a network device. For example, the processing unit 702 is configured to perform the steps 301 and 302 in FIG. 3. The communications unit 703 is configured to send the PUCCH or the PUSCH in FIG. 3.

Specifically, in an embodiment, the processing unit 702 is configured to: trigger an SR; if determining that the PUCCH carrying the SR and the PUSCH carrying a first data packet overlap in time domain of a first uplink resource, obtain a processing status of the PUSCH on the first uplink resource; and send, based on the processing status of the PUSCH on the first uplink resource, the PUCCH or the PUSCH on the first uplink resource by using the communications unit.

In a possible design, the processing unit is specifically configured to: when the processing status of the PUSCH on the first uplink resource is processing completed, if determining that a first priority of a logical channel for triggering the SR is higher than or equal to a second priority of a logical channel of the first data packet to be transmitted on the first uplink resource, send the PUCCH on the first uplink resource by using the communications unit.

In a possible design, the processing unit is specifically configured to: if determining, at a MAC layer, that the first priority is higher than or equal to the second priority, send first indication information to a physical layer, and send, at the physical layer based on the first indication information, the PUCCH on the first uplink resource by using the communications unit; or notify a physical layer of the first priority and the second priority at a MAC layer, and if determining, at the physical layer, that the first priority is higher than or equal to the second priority, send the PUCCH on the first uplink resource by using the communications unit. The second priority may be obtained by the communications apparatus when the communications apparatus assembles the first data packet.

Specifically, in an embodiment, the processing unit is configured to: trigger a scheduling request SR; and if determining that a PUCCH carrying the SR and a PUSCH carrying a first data packet overlap in time domain of a first uplink resource, send, based on a resource occupied by the PUSCH and a resource requirement of a logical channel for triggering the SR, the PUCCH or the PUSCH on an overlapping time domain resource by using the communications unit.

In a possible design, the processing unit is specifically configured to: if determining that the resource occupied by the PUSCH meets the resource requirement of the logical channel for triggering the SR, send the PUSCH on the overlapping time domain resource by using the communications unit.

In a possible design, when the terminal device determines that the resource occupied by the PUSCH meets the resource requirement of the logical channel for triggering the SR, the processing unit is further configured to: if determining that the first priority of the logical channel for triggering the SR is lower than or equal to the second priority of the logical channel of the first data packet, send the PUSCH on the overlapping time domain resource by using the communications unit.

In a possible design, the processing unit is specifically configured to: if the first priority is higher than the second priority, send the PUCCH on the overlapping time domain resource by using the communications unit.

In a possible design, the processing unit is specifically configured to: if determining that the resource occupied by the PUSCH does not meet the resource requirement of the logical channel for triggering the SR, send the PUCCH on the overlapping time domain resource by using the communications unit.

In a possible design, the communications unit is further configured to transmit the first data packet on a second uplink resource. The second uplink resource and the first uplink resource correspond to a same HARQ process.

In a possible design, the first data packet is stored in a buffer of the HARQ process corresponding to the second uplink resource.

In a possible design, the communications unit is further configured to send a second data packet on the second uplink resource. The second data packet includes some or all of information in the first data packet.

In a possible design, the communications unit is further configured to send third indication information to the network device. The third indication information is used to indicate that the first data packet is not sent or is not completely sent.

Specifically, in still another example, the processing unit is configured to: assemble a first data packet to be transmitted on a first uplink resource, and if determining that the first data packet is not sent or is not completely sent, transmit the first data packet on a second uplink resource by using the communications unit. The second uplink resource and the first uplink resource correspond to a same HARQ process.

In a possible design, the first data packet is stored in a buffer of the HARQ process corresponding to the second uplink resource.

It should be noted that, in this embodiment of this application, the unit (module) division is an example, and is merely a logical function division. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium may be any medium that can store program code, such as a memory.

Figure 8:
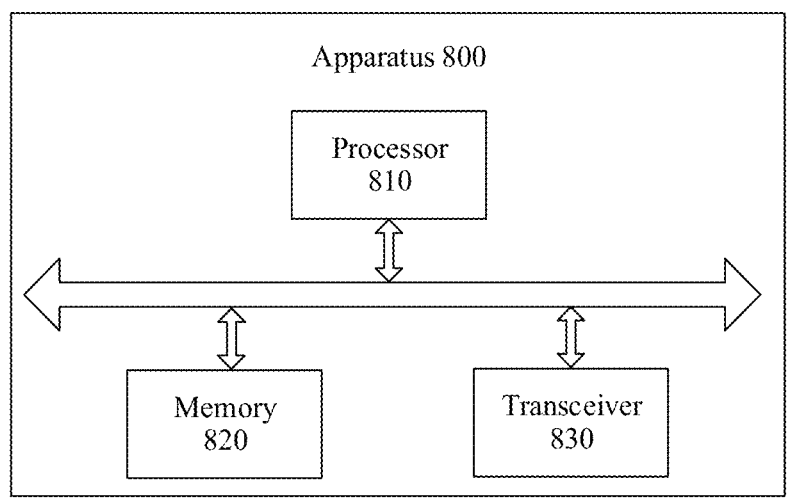
FIG. 8 is a schematic structural diagram of an apparatus according to an embodiment of this application.

FIG. 8 is a schematic structural diagram of an apparatus. The apparatus 800 includes a processor 810, a memory 820, and a transceiver 830. In an example, the apparatus 800 may implement functions of the apparatus 700 shown in FIG. 7. Specifically, the transceiver may implement a function of the communications unit 703 shown in FIG. 7, the processor may implement a function of the processing unit 702, and the memory may implement a function of the storage unit 701. In still another example, the apparatus 800 may be the terminal device in the foregoing method embodiment. The apparatus 800 may be configured to implement the method that corresponds to the terminal device and that is described in the foregoing method embodiment. For details, refer to the descriptions in the foregoing method embodiment.

Figure 9:
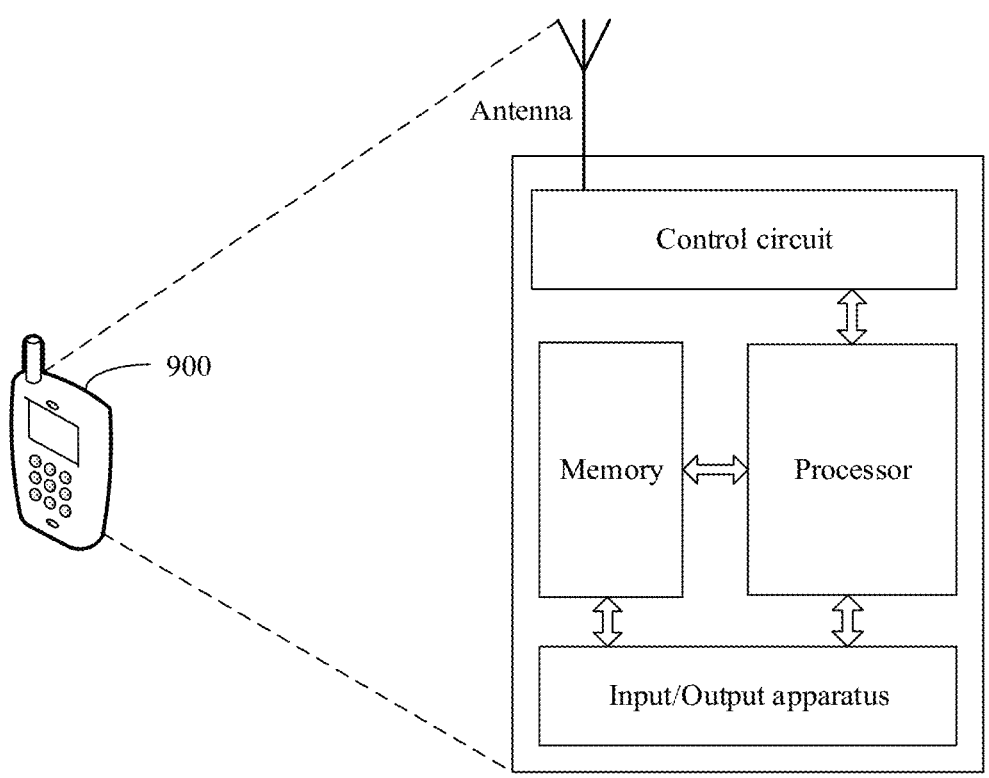
FIG. 9 is a schematic structural diagram of a terminal device according to an embodiment of this application.

FIG. 9 is a schematic structural diagram of a terminal device 900 according to an embodiment of this application. For ease of description, FIG. 9 shows only main components of the terminal device. As shown in FIG. 9, the terminal device 900 includes a processor, a memory, a control circuit, an antenna, and an input/output apparatus. The terminal device 900 may be applied to the system architecture shown in FIG. 1, and perform a function of the terminal device in the foregoing method embodiments.

The processor is mainly configured to: process a communication protocol and communications data, control the entire terminal device, execute a software program, and process data of a software program, for example, is configured to control the terminal device in performing an action described in the foregoing embodiment of the method. The memory is mainly configured to store a software program and data. The control circuit is mainly configured to: perform conversion between a baseband signal and a radio frequency signal, and process the radio frequency signal. A combination of the control circuit and the antenna may be referred to as a transceiver, mainly configured to send and receive a radio frequency signal in an electromagnetic wave form. The input/output apparatus, such as a touchscreen, a display screen, or a keyboard, is mainly configured to receive data input by a user and output data to the user.

After the terminal device is powered on, the processor may read the software program in a storage unit, explain and execute an instruction of the software program, and process the data of the software program. When data needs to be sent in a wireless manner, after performing baseband processing on the to-be-sent data, the processor outputs a baseband signal to the radio frequency circuit. After performing radio frequency processing on the baseband signal, the radio frequency circuit sends a radio frequency signal through an antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 9 shows only one memory and only one processor. An actual terminal device may have a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process a communication protocol and communications data. The central processing unit is mainly configured to control the entire terminal device, execute a software program, and process data of the software program. Functions of the baseband processor and the central processing unit are integrated into the processor in FIG. 9. A person skilled in the art may understand that the baseband processor and the central processing unit each may be an independent processor, and are interconnected by using such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communications data may be built in the processor, or may be stored in the storage unit in a form of software program. The processor executes the software program to implement a baseband processing function.

The terminal device 900 shown in FIG. 9 can implement the processes related to the terminal device in the method embodiment shown in FIG. 3. The operations and/or the functions of the modules in the terminal device 900 are intended to implement corresponding procedures in the foregoing method embodiment. For details, refer to the descriptions in the foregoing method embodiments. To avoid repetition, detailed descriptions are properly omitted herein.

In an implementation process, the steps of the methods in the embodiments may be performed by using a hardware integrated logical circuit in the processor, or by using instructions in a form of software. The steps of the method disclosed with reference to the embodiments of this application may be directly performed by a hardware processor, or may be performed by using a combination of hardware in the processor and a software module.

It should be noted that the processor in the embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose central processing unit (CPU), a general-purpose processor, digital signal processing (DSP), an application-specific integrated circuit (ASIC), a field programmable gate array (FPGA), another programmable logic device, a transistor logic device, a hardware component, or any combination thereof; or may be a combination of processors implementing a computing function, for example, a combination of one or more microprocessors or a combination of a DSP and a microprocessor. The general purpose processor may be a microprocessor, or the processor may be any conventional processor or the like.

It may be understood that the memory or the storage unit in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer programs or instructions. When the computer programs or instructions are loaded and executed on the computer, the procedure or functions according to the embodiments of this application are all or partially generated. The computer may be a general-purpose computer, a dedicated computer, a computer network, or other programmable apparatuses. The computer program or instruction may be stored in a computer readable storage medium, or may be transmitted by using the computer readable storage medium. The computer-readable storage medium may be any usable medium accessible by a computer, or a data storage device, such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (SSD).

The various illustrative logical units and circuits described in the embodiments of the present disclosure may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. Exemplarily, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in terminal device. Alternatively, the processor and the storage medium may also be arranged in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the embodiments of this application are described with reference to specific features, it is clear that various modifications and combinations may be made to them without departing from the spirit and scope of the embodiments of this application. Correspondingly, the specification and accompanying drawings are merely example description of the embodiments of this application defined by the accompanying claims, and is considered as any of or all modifications, variations, combinations or equivalents that cover the scope of the embodiments of this application.

What is claimed is:

1. A communications method, performed by a terminal device or a chip in the terminal device, the method comprising:

triggering a scheduling request (SR), wherein a physical uplink control channel (PUCCH) resource for carrying the SR and a first uplink resource for a physical uplink shared channel (PUSCH) carrying a first data packet overlap, wherein a first priority of a logical channel for triggering the SR is higher than a second priority for the PUSCH carrying the first data packet, and wherein the second priority is determined by a highest priority among priorities of logical channels for the first data packet;

transmitting the SR on the PUCCH resource overlapped with the first uplink resource, wherein the transmitting the SR on the PUCCH resource overlapped with the first uplink resource comprises:
sending first indication information to a physical layer of the terminal device; and
sending the SR on the PUCCH resource overlapped with the first uplink resource based on the first indication information at the physical layer; and transmitting the first data packet on a second uplink resource, wherein the second uplink resource and the first uplink resource correspond to a same hybrid automatic repeat request (HARQ) process.

2. The method according to claim 1,
wherein the first data packet is a media access control protocol data unit (MAC PDU); and
wherein a processing status of the PUSCH on the first uplink resource is a status indicating that the MAC PDU has been assembled.

3. The method according to claim 1, wherein the second priority is obtained by the terminal device in response to the terminal device assembling the first data packet.

4. The method according to claim 1, wherein the first data packet is stored in a buffer of the HARQ process corresponding to the second uplink resource.

5. The method according to claim 1, wherein both the first uplink resource and the second uplink resource are pre-configured grant resources.

6. The method according to claim 1, further comprising:
assembling, by the terminal device, the first data packet to be transmitted on the first uplink resource;
wherein the transmitting, by the terminal device, the first data packet on the second uplink resource comprises:
in response to determining that the first data packet is not sent or is not completely sent, transmitting, by the terminal device, the first data packet on the second uplink resource.

7. An apparatus, comprising:
a processor; and
a memory storing instructions, wherein the instructions are executed by the processor to cause the apparatus to perform a method of:
triggering a scheduling request (SR), wherein a physical uplink control channel (PUCCH) resource for carrying the SR and a first uplink resource for a physical uplink shared channel (PUSCH) carrying a first data packet overlap, wherein a first priority of a logical channel for triggering the SR is higher than a second priority for the PUSCH carrying the first data packet, and wherein the second priority is determined by a highest priority among priorities of logical channels for the first data packet;
transmitting the SR on the PUCCH resource overlapped with the first uplink resource, wherein the transmitting the SR on the PUCCH resource overlapped with the first uplink resource comprises:
sending first indication information to a physical layer of the apparatus; and
sending the SR on the PUCCH resource overlapped with the first uplink resource based on the first indication information at the physical layer; and
transmitting the first data packet on a second uplink resource, wherein the second uplink resource and the first uplink resource correspond to a same hybrid automatic repeat request (HARQ) process.

8. The apparatus according to claim 7,
wherein the first data packet is a media access control protocol data unit (MAC PDU); and
wherein a processing status of the PUSCH on the first uplink resource is a status indicating that the MAC PDU has been assembled.

9. The apparatus according to claim 7, wherein the second priority is obtained in response to the apparatus assembling the first data packet.

10. The apparatus according to claim 7, wherein the first data packet is stored in a buffer of the HARQ process corresponding to the second uplink resource.

11. The apparatus according to claim 7, wherein both the first uplink resource and the second uplink resource are pre-configured grant resources.

12. The apparatus according to claim 7, wherein the method further comprises:
assembling the first data packet to be transmitted on the first uplink resource;
wherein the transmitting the first data packet on the second uplink resource comprises:
in response to determining that the first data packet is not sent or is not completely sent, transmitting the first data packet on the second uplink resource.

* * * * *